United States Patent
Bouaziz et al.

(10) Patent No.: US 10,586,372 B2
(45) Date of Patent: Mar. 10, 2020

(54) ONLINE MODELING FOR REAL-TIME FACIAL ANIMATION

(71) Applicant: Apple Inc., Cupertino, CA (US)

(72) Inventors: Sofien Bouaziz, Lausanne (CH); Mark Pauly, Lausanne (CH)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/259,818

(22) Filed: Jan. 28, 2019

(65) Prior Publication Data

US 2019/0156549 A1 May 23, 2019

Related U.S. Application Data

(63) Continuation of application No. 15/641,428, filed on Jul. 5, 2017, now Pat. No. 10,192,343, which is a continuation of application No. 15/167,966, filed on May 27, 2016, now Pat. No. 9,734,617, which is a continuation of application No. 13/912,378, filed on Jun. 7, 2013, now Pat. No. 9,378,576.

(51) Int. Cl.
| | | |
|---|---|---|
| G06T 13/40 | (2011.01) | |
| G06T 7/292 | (2017.01) | |
| G06K 9/00 | (2006.01) | |
| G06T 15/50 | (2011.01) | |

(52) U.S. Cl.
CPC .......... *G06T 13/40* (2013.01); *G06K 9/00315* (2013.01); *G06T 7/292* (2017.01); *G06T 15/503* (2013.01)

(58) Field of Classification Search
CPC ....... G06T 13/40; G06T 7/292; G06T 15/503; G06K 9/00315

USPC .......................................................... 382/103
See application file for complete search history.

(56) References Cited

U.S. PATENT DOCUMENTS

| | | |
|---|---|---|
| 8,207,971 B1 | 6/2012 | Koperwas |
| 9,111,134 B1 | 8/2015 | Rogers |

FOREIGN PATENT DOCUMENTS

| | | |
|---|---|---|
| CN | 102713933 A | 10/2012 |

OTHER PUBLICATIONS

Amberg, B, et al., "On Compositional Image Alignment, with an Application to Active Appearance Models," IEEE Conference on Computer Vision and Pattern Recognition, Jun. 2009, pp. 1714-1721.
Baltrusaitis, T., et al., "3D Constrained Local Model for Rigid and Non-Rigid Facial Tracking," IEEE Conference on Computer Vision and Pattern Recognition, Jun. 2012.
(Continued)

*Primary Examiner* — Amandeep Saini
(74) *Attorney, Agent, or Firm* — Blank Rome LLP

(57) ABSTRACT

Embodiments relate to a method for real-time facial animation, and a processing device for real-time facial animation. The method includes providing a dynamic expression model, receiving tracking data corresponding to a facial expression of a user, estimating tracking parameters based on the dynamic expression model and the tracking data, and refining the dynamic expression model based on the tracking data and estimated tracking parameters. The method may further include generating a graphical representation corresponding to the facial expression of the user based on the tracking parameters. Embodiments pertain to a real-time facial animation system.

20 Claims, 8 Drawing Sheets

(56) References Cited

OTHER PUBLICATIONS

Barrett, R., et al., Templates for the Solution of Linear Systems: Building Blocks for Iterative Methods, 2nd ed., SIAM, Philadelphia, PA, 1994, pp. 1-117.

Beeler, T., et al., "High-Quality Passive Facial Performance Capture using Anchor Frames," ACM Transactions on Graphics, Jul. 2011, vol. 30, Issue 4, Article No. 75, pp. 1-10.

Bickel, B., et al., "Pose-Space Animation and Transfer of Facial Details," Eurographics/ACM SIGGRAPH Symposium on Computer Animation, Jul. 2008, pp. 1-10.

Blanz, V., et al., "A Morphable Model for the Synthesis of 3D Faces," SIGGRAPH '99: Proceedings of the 26th Annual Conference on Computer Graphics and Interactive Techniques, Aug. 1999, pp. 187-194.

Botsch, M., et al., "Deformation Transfer for Detail-Preserving Surface Editing," Vision, Modeling & Visualization Proceedings, Nov. 2006, pp. 357-364.

Botsch, M., et al., Polygon Mesh Processing, A K Peters, Ltd., Natick, MA, Sep. 22, 2010, p. 1.

Bradley, D., et al., "High Resolution Passive Facial Performance Capture," ACM Transactions on Graphics, Jul. 2010, vol. 29, No. 4, pp. 1-10.

Chai, J., et al., "Vision-based Control of 3D Facial Animation," Eurographics/ACM SIGGRAPH Symposium on Computer Animation, Jul. 2003, pp. 193-206.

Deng, Z., et al., "Animating Blendshape Faces by Cross-Mapping Motion Capture Data," Proceedings of the 2006 Symposium on Interactive 3D Graphics and Games, Mar. 2006, pp. 1-7.

Erika Chuang and Chris Bregler: "Performance driven facial animation using blendshape interpolation," 2002, pp. 1-8, XP002728212, Retrieved from the Internet: URL:http://graphics.stanford.edu/~echuang/face/report2.pdf [retrieved on Aug. 6, 20146] abstract.

Fu, W. J., "Penalized Regressions: The Bridge Versus the Lasso," Journal of Computational and Graphical Statistics, 1998, vol. 7, No. 3, pp. 397-416.

Furukawa, Y., et al., "Dense 3D Motion Capture for Human Faces," IEEE Conference on Computer Vision and Pattern Recognition, Jun. 2009, pp. 1-8.

Huang, H., et al., "Leveraging Motion Capture and 3D Scanning for High-fidelity Facial Performance Acquisition," ACM Transactions on Graphics, Jul. 2011, vol. 30, No. 4, Article No. 74, pp. 1-10.

Levy, B., et al., "Spectral Mesh Processing," SIGGRAPH Asia '09, Dec. 2009, Course 32, Article No. 17, pp. 1-47.

Li, H., et al., "Example-Based Facial Rigging," ACM Transactions on Graphics, Jul. 2010, vol. 29, No. 4, Article No. 32, pp. 1-6.

Lin, I., et al., "Mirror MoCap: Automatic and efficient capture of dense 3D facial motion parameters from video," The Visual Computer, Jul. 2005, vol. 21, No. 6, pp. 355-372.

Liu, X., Mao, T., Xia, S., Wang, Z. and Yu, Y.: "Facial animation by optimized blendshapes from motion capture data," Computer Animation and Virtual Worlds, No. 19, Aug. 6, 2008 (Aug. 6, 2008), pp. 235-245, XP002728211, Retrieved from the Internet: URL: http://onlinelibrary.wiley.com/doi/10.1002/cav.248/pdf [retrieved on Aug. 6, 2014].

Ma, W.C., et al., "Facial Performance Synthesis using Deformation-Driven Polynomial Displacement Maps," ACM Transactions on Graphics, Dec. 2008, vol. 27, No. 5, pp. 1-10.

Madsen, K., et al., Methods for Non-Linear Least Squares Problems, 2nd ed., Technical University of Denmark, Kongens Lyngby, Denmark, 2004, pp. 1-30.

Pighin, F., et al., "Performance-Driven Facial Animation," SIGGRAPH 2006: The 33rd International Conference and Exhibition of Computer Graphics and Interactive Techniques, Aug. 2006, pp. 1-418.

Rusinkiewicz, S., et al., "Efficient Variants of the ICP Algorithm," Third International Conference on 3D Digital Imaging and Modeling, May-Jun. 2001, pp. 1-8.

Saragih, J.M., et al., "Real-time Avatar nimation from a Single Image," IEEE International Conference on Automatic Face and Gesture Recognition, Mar. 2011, pp. 213-220.

Sumner, R.W., et al., "Deformation Transfer for Triangle Meshes," ACM Transactions on Graphics, Aug. 2004, vol. 23, No. 3, pp. 399-405.

Thibaut Weise, Sofien Bouaziz, Hao Li and Mark Pauly: "Realtime performance-based facial animation," SIGGRAPH11, vol. 30, No. 4, 77, Jul. 2011 (Jul. 2011), pp. 1-9, Retrieved from the Internet: URL: http://dl.acm.org/citation.cfm?id=1964972 [retrieved on Aug. 6, 20146].

Valgaerts, L., et al., "Lightweight Binocular Facial Performance Capture under Uncontrolled Lighting," ACM Transactions on Graphics, Nov. 2012, vol. 31, No. 6, pp. 1-11.

Viola, P., et al., "Rapid Object Detection using a Boosted Cascade of Simple Features," Proceedings of the 2001 IEEE Conference on Computer Vision and Pattern Recognition, Dec. 2001, vol. 1, pp. 511-518.

Weise, T., et al., "Face/Off: Live Facial Puppetry," Eurographics/ACM SIGGRAPH Symposium on Computer Animation, Aug. 2009, pp. 1-10.

Zhang L. et al., "Spacetime Faces: High Resolution Capture for Modeling and Animation," ACM Transactions on Graphics, Aug. 2004, vol. 23, No. 3, pp. 548-558.

ONLINE MODELING FOR REAL-TIME FACIAL ANIMATION

BACKGROUND

This is a continuation of, and claims priority to, U.S. patent application Ser. No. 15/641,428, entitled "Online Modeling For Real-Time Facial Animation," which further is a continuation of, and claims priority to, U.S. patent application Ser. No. 15/167,966, entitled "Online Modeling For Real-Time Facial Animation," which further is a continuation of, and claims priority to, U.S. patent application Ser. No. 13/912,378, all of which are hereby incorporated by reference in their entirety.

The present disclosure relates to a method for real-time facial animation and, in particular, to a processing device and a real-time facial animation system. Moreover, the disclosure relates to a dynamic expression model which may include a plurality of blendshapes that may be used to track facial expressions of a user in order to generate a corresponding graphical representation.

Recent advances in real-time performance capture have brought within reach a new form of human communication. Capturing dynamic facial expressions of users and re-targeting these facial expressions on digital characters enables a communication using virtual avatars with live feedback. Compared to communication via recorded video streams that only offer limited ability to alter the appearance of users, facial animation opens the door to fascinating new applications in computer gaming, social networks, television, training, customer support, or other forms of online interactions. However, a successful deployment of facial animation technology at a large scale puts high demands on performance and usability.

State of the art marker-based systems, multi-camera capture devices, or intrusive scanners commonly used in high-end animation productions are not suitable for consumer-level applications. Equally inappropriate are methods that require complex calibration or necessitate extensive manual assistance to set up or create the system. Several real-time methods for face-tracking have been proposed. Yet, video-based methods typically track a few facial features and often lack fine-scale detail which limits the quality of the resulting animations. Tracking performance can also degrade in difficult lighting situations that, for example, commonly occur in home environments.

State of the art approaches also require an a prior creation of a tracking model and extensive training which requires the building of an accurate three-dimensional (3D) expression model of the user by scanning and processing a predefined set of facial expressions. Beyond being time consuming, such pre-processing is also erroneous. Users are typically asked to move their head in front of a sensor in specific static poses to accumulate sufficient information. However, assuming and maintaining a correct pose (e.g., keeping the mouth open in a specific, predefined opening angle) may be exhaustive and difficult and often requires multiple tries. Furthermore, manual corrections and parameter tuning is required to achieve satisfactory tracking results. Hence, user-specific calibration is a severe impediment for deployment in consumer-level applications.

Animating digital characters based on facial performance capture is known in the art. For example, marker-based systems are used to capture real-time performances, wherein explicit face markers may be placed on the face of a user in order to simplify tracking. However, the face markers limit the amount of spatial detail that can be captured. Systems utilizing a single camera to record facial performances often lead to a substantially low tracking quality involving artifacts in the generated face animations. Performance capture systems based on dense 3D acquisition, such as structured light scanners or multi-view camera systems, are capable of capturing fine-scale dynamics, however, require a significant amount of processing time, thereby impeding interactive frame rates. Moreover, systems applying a combination of markers and 3D scanning often require specialized hardware set-ups that need extensive and careful calibration.

SUMMARY

Embodiments of the disclosed subject matter relate to a method for real-time facial animation, a processing device for real-time facial animation, and a real-time facial animation system. Specific embodiments pertain to a computer-readable medium having machine-readable instructions stored thereon for performing a method for real-time facial animation and a real-time facial animation system.

A first aspect of the present disclosure provides a method for real-time facial animation, comprising providing a dynamic expression model and receiving tracking data corresponding to a facial expression of a user. Tracking parameters are estimated based on the dynamic expression model and the tracking data. Furthermore, the dynamic expression model is refined based on the tracking data and the estimated tracking parameters.

The tracking data may be organized in frames, wherein each frame of tracking data corresponds to a particular facial expression of the user captured in this frame. Accordingly, the tracking data may include one or more frames and each frame of tracking data may correspond to a current facial expression of the user according to the facial performance of the user. For example, the tracking data may be provided as optical three-dimensional (3D) and/or two-dimensional (2D) data, such as a series of video frames including depth information, which may be provided by commodity, RGB-D sensing devices. Yet, the present disclosure is not limited to a particular sensing device or optical data only and may further include electro-magnetic or acoustic tracking data. Each frame of tracking data may be used to estimate the tracking parameters, which may be further used to generate a graphical representation for the current facial expression corresponding to the current frame. The frame of tracking data in combination with the estimated tracking parameters may be further used for refinement of the dynamic expression model. Accordingly, an initial dynamic expression model may be directly used for tracking and is continuously refined to better match the facial characteristics of the user according to an online modeling approach. In this description the term online modeling is used in the sense of an online algorithm or approach, which processes input piece-by-piece in a serial fashion, for example, in the order that the input is provided to the algorithm, without having the entire input, such as all frames of tracking data, available from the start. Hence, an online algorithm could be understood in contrast to an offline algorithm which directly requires the entire input data. Therefore, the dynamic expression model may be continuously refined using a current piece of tracking data in each frame in a serial fashion.

A dynamic expression model may be a parameterized face model with expressions, wherein respective parameters can be used to adapt the expressions to a facial geometry and performance of a user. In one embodiment, the dynamic expression model includes a plurality of blendshapes and the tracking parameters include weights for the blendshapes.

The blendshapes of the dynamic expression model may be organized as a set of blendshapes, wherein each blendshape may correspond to a polygon mesh or point cloud or any other representation of a geometrical 3D surface suitable for representing a facial expression. Each blendshape may preferably corresponds to a pre-defined facial expression, for example, matching pre-defined semantics of common face animation controllers such as smile, frown, mouth-open, etc. Preferably, the plurality of blendshapes may include 3D meshes having the same static mesh combinatorics, which may be represented by stacked coordinate vectors offering a compact representation.

The blendshapes may be weighted and combined to generate a facial expression, which approximates the facial expression of the user as defined by the current tracking data, such as the tracking data of a frame. The blendshape representation is well suited for real-time performance capture, since it reduces a detailed tracking of individual features of the user to estimating the respective weights for the blendshapes in each frame. Once the weights have been estimated, the weights may be used for the facial animation of the user and, in combination with the tracking data, for further refinement of the dynamic expression model. The dynamic expression model and the plurality of blendshapes are better matched to the individual facial characteristics of the user during a process which is fully integrated into the tracking process of the facial expressions. Accordingly, the dynamic expression model can be adapted to a specific user on the fly without requiring any manual assistance. Hence, a specific plurality of blendshapes corresponding to a tracked user may be built or refined concurrently to the tracking procedure, requiring no preceding training or calibration stage. Rather, starting from a rough initial estimate, the dynamic expression model is continuously refined as tracking progresses.

According to one embodiment, said estimating of tracking parameters and said refining of the dynamic expression model are performed in real-time. The unique selection of a dynamic expression model, for example, including a fixed set of blendshapes, used for tracking of the user and the integrated refinement of the dynamic expression model enables a processing in real-time. Hence, the method yields a fully automatic real-time face tracking animation system suitable for a broad range of applications, such as consumer-level applications.

Embodiments of the subject facial animation method according to the present disclosure provide for real-time face tracking and animation and require no user-specific training or calibration or any other form of manual assistance, thus enabling a broad range of applications of performance-based facial animation and virtual interaction, for example, at consumer level. Embodiments can raise tracking quality while keeping the acquisition system simple enough for consumer-level applications and avoiding any manual system calibration or training. In particular, embodiments of the method require neither user-specific pre-processing, nor any calibration or user-assisted training, thereby making the tracking system directly operational for any new user.

According to yet another embodiment, said estimating of tracking parameters, such as weights for the blendshapes of the dynamic expression model, is performed in a first stage, and said refining of the dynamic expression model is performed in a second stage, wherein the first stage and the second stage are iteratively repeated. Accordingly, in the first stage a rigid alignment of the tracking data and tracking parameters, such as the blendshape weights, may be estimated keeping the dynamic expression model fixed. In the second stage, the user-specific dynamic expression model may be refined keeping the tracking parameters fixed. Hence, while the facial tracking is accomplished in real-time, the dynamic expression model may be continuously refined to the currently tracked user following an online modeling approach. For example, a fixed number of blendshapes of the dynamic expression model can be refined to the facial performance and geometry of the tracked user. The refinement approach is advantageous, since it needs not to extend the dynamic expression model, for example by adding further blendshapes. Using a fixed number of blendshapes optimizes memory consumption and computational performance.

In yet another embodiment, a graphical representation corresponding to the facial expression of the user is generated based on the tracking parameters. The graphical representation may be used for rendering an animated visual representation of the user. The generation of the graphical representation may be performed within the same processing module or on the same processing device. However, the generation of the graphical representation may also be performed in a different processing module, process, task or on a different processing device. For example, one or more processing steps according to embodiments may be encapsulated using a programming interface or a kit, such as an application programming interface (API) or a software development kit (SDK). Such programming interface or kit may, for example, provide one or more of the tracking parameters, and the dynamic expression model to a different processing entity, which may thereafter generate and render the graphical representation.

In yet another embodiment, the method further comprises receiving further tracking data corresponding to facial expressions of the user, estimating updated weights for the blendshapes of the refined dynamic expression model based on the further tracking data, and generating the graphical representation based on the updated weights. The method may be iteratively repeated, wherein the first stage and the second stage may be interlaced in each frame.

In yet another embodiment, the method further comprises receiving tracking data corresponding to a neutral facial expression of the user and initializing the dynamic expression model using the tracking data corresponding to the neutral facial expression of the user. The user may, for example, enter a field of view of a tracking sensor in a neutral facial expression. The corresponding tracking data may be used to initialize at least one of the plurality of blendshapes of the dynamic expression model in order to reflect the neutral facial expression of the user. This initial approximation of the neutral facial expression may be further refined in subsequent alterations, such as alterations of the first and second stages.

According to one embodiment, the plurality of blendshapes at least includes a blendshape $b_0$ representing a neutral facial expression and the dynamic expression model further includes an identity principal component analysis (PCA) model, the method further including matching the blendshape $b_0$ representing the neutral facial expression to the neutral expression of the user based on the tracking data and the identity PCA model. The identity PCA model may represent variations of face geometries across different users and may be used to initialize the plurality of blendshapes including the blendshape $b_0$ to the face geometry of the user. The variations of face geometries may be, for example, captured with a morphable model as, for example, proposed by V. Blanz V. and T. Vetter in "A morphable model for the syntheses of 3D faces", SIGGRAPH 1999, which is incorporated herein in its entirety. Given a large set of meshes of different human faces with a one-to-one vertex correspondence in neutral expression, a reduced representation may be built using PCA on stacked vertex coordinate vectors of the meshes. The identity PCA model may include a resulting mean face and one or more eigenvectors forming an orthonormal basis. Accordingly the blendshape $b_0$ representing the neutral facial expression of a specific user can be estimated as a linear combination of the mean face and at least some of the eigenvectors with suitable linear coefficients, such that the blendshape $b_0$ approximates the facial expression represented by the tracking data.

In yet another embodiment, the plurality of blendshapes further includes one or more blendshapes $b_i$, each representing a different facial expression and the dynamic expression model further includes a template blendshape model, the method further including approximating the one or more blendshapes $b_i$ based on the template blendshape model and the blendshape $b_0$ representing the neutral facial expression. The template blendshape model may be pre-defined a prior and may be modeled by hand. The template blendshapes of the template blendshape model may correspond to the same or similar expression semantics as the plurality blendshapes of the dynamic expression model, such as the same pre-defined semantics of common face animation controllers. Using the template blendshape model, the known deformation of a template blendshape $b^*_0$ representing a neutral expression to another template blendshape $b^*_i$ representing a specific facial expression in the template blendshape model may be applied to the blendshape $b_0$ representing the neutral facial expression in order to obtain a corresponding blendshape $b_i$ of the plurality of blendshapes of the dynamic expression model. Preferably, the known deformations may be represented using an operator that does not depend on the blendshape $b_0$, such that the refinement of the dynamic expression model may be formulated as a solution of a linear system, which can be computed efficiently and robustly.

In yet another embodiment, the dynamic expression model further includes corrective deformation fields, the method further including applying at least one of the correcting deformation fields to each of the plurality of blendshapes. The identity PCA model may represent the large-scale variability of facial geometries in the neutral expression. In order to better capture user-specific details and facial dynamics of the user, additional surface deformation fields may be applied to each one of the plurality of blendshapes to obtain a more faithful reconstruction of the user's facial expression space. The corrective deformation fields may be constructed based on per-vertex displacements that may be modeled using a spectral representation defined by a number of eigenvectors of the graph Laplacian matrix computed on the 3D face mesh, such as the last k eigenvectors of the graph Laplacian matrix. The computation and application of a graph Laplacian matrix is well known to a person skilled in the art and, for example, detailed in B. Levy and T. H. Zhang: "Spectral geometry processing" SIGGRAPH Course Notes 2010. A smooth deformation field can be defined as a linear combination of the eigenvectors and corresponding spectral coefficients. The spectral basis offers mainly two advantages: the corrective deformations can be optimized in a low-dimensional space requiring only a limited number of variables to represent the deformation of a blendshape mesh; and the in-built smoothness of the low-frequency eigenvectors helps to avoid over-fitting when aligning the blendshapes to biased tracking data, such as noisy depth maps.

According to another embodiment, the method further includes parameterizing the one or more blendshapes $b_i$ as $b_i = T^*_i b_0 + Ez_i$, wherein $T^*_i$ is an expression transfer operator derived from known deformations of the template blendshape model applied to the blendshape $b_0$ representing the neutral facial expression, and $Ez_i$ is the corrective deformation field for blendshape $b_i$. The parameterized dynamic expression model can be adapted to the facial geometry and expressions of any user by approximating the neutral facial expression of the user with the identity PCA model, applying deformations known from the template blendshape model on the representation of the neutral facial expression in order to derive the remaining blendshapes, and applying expression-specific deformation fields to the blendshapes. Preferably, the approach may use an optimization method that jointly solves for a detailed 3D dynamic expression model of the user and the corresponding dynamic tracking parameters. Real-time performance and robust computations are facilitated by a subspace parameterization of the dynamic facial expression space leading to a significantly simplified capture workflow while achieving accurate facial tracking for real-time applications.

In yet another embodiment, said refining of the dynamic expression model is based on tracking data received for a current frame and one or more past frames. The refinement of the dynamic expression model may take into consideration a current expression as well as the history of all or at least some observed expressions represented by respective tracking data of the current and past frames. The tracking data of past frames may be combined according to an aggregation scheme in order to handle memory and computation overhead imposed by the frame history thereby keeping the memory cost constant.

According to one embodiment, the method includes aggregating the tracking data of the one or more past frames subject to a decay over time. For example, a contribution of tracking data obtained in a past frame j to refinement of the dynamic expression model in a current frame t may be formulated using a decay coefficient $\gamma$ with $0 \leq \gamma \leq 1$, wherein the tracking data of the passed frame j may be weighted with $\gamma^{t-j}$.

In yet another embodiment, said refining of the dynamic expression model includes determining a coverage coefficient $\sigma_i$; for each blendshape $b_i$ of the dynamic expression model indicative of the applicability of the past tracking data for the blendshape $b_i$ wherein the method further includes only refining blendshapes having a coverage coefficient below a pre-determined threshold. Accordingly, the method may include comparing a coverage coefficient of a blendshape with a pre-determined threshold, such as a lower bound or limit, and refining the blendshape if the coverage coefficient is below the pre-determined threshold. The method may also include omitting blendshapes from refinement of the dynamic expression model if a corresponding coverage coefficient is above the pre-determined threshold. However, it is to be understood that the respective threshold may also be defined as an upper bound and the blendshapes may only be refined if the coverage coefficient is above the threshold, and vice versa. Since the dynamic expression model is continuously refined during tracking, the generic dynamic expression model may be progressively adapted to the facial features of the specific user as more and more of the user's expressions are observed, leading to more accurate tracking and resulting facial animation. As soon as a facial expression has been observed and the corresponding blendshape refined sufficiently many times, the blendshapes of the dynamic expression model may selectively converge to a steady state thereby further improving computation performance. Hence, blendshapes that have been optimized often enough can be considered as saturated and removed from the refinement of the dynamic expression model.

In one embodiment, the graphical representation corresponding to the facial expression of the user is generated by applying the weights to the plurality of blendshapes. Hence, the graphical representation closely resembles the appearance of the user and is continuously refined to the face geometry and dynamics of the user. In another embodiment, the graphical representation corresponding to the facial expression of the user is generated based on one or more blendshapes representing a virtual avatar. The virtual avatar may be defined as a set of avatar blendshapes representing the face geometry of the virtual avatar. The avatar blendshapes may be chosen and defined according to the semantics of the plurality of blendshapes of the dynamic expression model. Accordingly, the weights determined for the blendshapes of the dynamic expression model may be directly applied to the avatar blendshapes.

According to another aspect, a computer-readable medium having instructions stored thereon is provided, wherein said instructions, in response to execution by a computing device, cause said computing device to automatically perform a method for real-time facial animation according to embodiments of the present disclosure. Preferably, the computing device may be configured to automatically perform the steps of providing a dynamic expression model; receiving tracking data corresponding to a facial expression of a user; estimating tracking parameters based on the dynamic expression model and the tracking data; generating a graphical representation corresponding to the facial expression of the user based on the tracking parameters; and refining the dynamic expression model based on the tracking data and the estimated tracking parameters.

According to yet another aspect, a processing device is provided, which includes an input interface configured to receive tracking data corresponding to facial expressions of a user; a memory configured to store a dynamic expression model; and a processing component coupled to the input interface and the memory, configured to estimate tracking parameters based on the dynamic expression model and the tracking data, and refine the dynamic expression model based on the tracking data and the estimated tracking parameters. The processing device enables fully automated face tracking and animation, which can be easily set-up and operated even in consumer-level applications.

According to one embodiment, the processing component is further configured to estimate the tracking parameters and refine the dynamic expression model in real-time. In yet another embodiment, the processing component is further configured to estimate the tracking parameters in a first stage and refine the dynamic expression model in a second stage, wherein the first stage and the second stage are iteratively repeated. The processing component may schedule the first and the second stages for parallel processing on one or more processing units of the processing component, such as one or more cores of a multi-core processor. Similarly, particular processing steps of the second stage may also be distributed and performed on other processing component of the processing device or which may be interconnected with the processing component of the processing device.

In one embodiment, the dynamic expression model stored in the memory includes a plurality of blendshapes and the tracking parameters include weights for the blendshapes, wherein the processing component is configured to estimate the weights for the blendshapes.

According to another embodiment, the processing component is further configured to generate a graphical representation corresponding to a current facial expression of the user based on the tracking parameters.

In yet another embodiment, the input interface is further configured to receive further tracking data corresponding to facial expressions of the user and the processing component is further configured to estimate updated tracking parameters based on the refined dynamic expression model and the further tracking data, and generate the graphical representation based on the updated tracking parameters. According to another embodiment, the input interface is further configured to receive tracking data corresponding to a neutral facial expression of the user and the processing component is further configured to initialize the dynamic expression model using the tracking data corresponding to the neutral facial expression of the user.

In one embodiment, the plurality of blendshapes at least include a blendshape $b_0$ representing a neutral facial expression and the dynamic expression model further includes an identity PCA model, wherein the processing component is further configured to match the blendshape $b_0$ representing the neutral facial expression to the neutral expression of the user based on the identify PCA model.

In yet another embodiment, the plurality of blendshapes further includes one or more blendshapes $b_i$, each representing a different facial expression, and the dynamic expression model further includes a template blendshape model, wherein the processing component is further configured to approximate the one or more blendshapes $b_i$ based on the template blendshape model and the blendshape $b_0$ representing the neutral facial expression. Preferably, the dynamic expression model includes a fixed number of blendshapes $b_0$ and $b_i$, which is not extended during refinement.

According to a further embodiment, the dynamic expression model further includes corrective deformation fields, wherein the processing component is further configured to apply at least one of the corrective deformation fields to each of the plurality of blendshapes.

In yet another embodiment, the processing component is further configured to parameterize the one or more blendshapes $b_i$ as $b_i = T^*_i b_0 + E z_i$, wherein $T^*_i$ is an expression transfer operator derived from the template blendshape model applied to the blendshape $b_0$ representing the neutral facial expression, and $E z_i$ is the corrective deformation field for blendshape $b_i$. According to a further embodiment, the processing component is configured to refine the dynamic expression model based on tracking data received for a current frame and one or more past frames.

In yet another embodiment, the tracking data of the one or more past frames are aggregated and decayed over time.

In one embodiment, in order to refine the dynamic expression model, the processing component is further configured to determine a coverage coefficient for each blendshape of the dynamic expression model indicative of the applicability of the past tracking data for the blendshape, and only refine blendshapes having a coverage coefficient below a predetermined threshold.

According to one embodiment, the memory is further configured to store one or more blendshapes representing a virtual avatar and the processing component is further configured to generate the graphical representation corresponding to the facial expressions of the user based on the at least some of the one or more blendshapes representing the virtual avatar. Preferably, the one or more blendshapes representing the virtual avatar may be chosen to match facial semantics corresponding to facial semantics of the plurality of blendshapes of the dynamic expression model. Accordingly, the weights estimated for the plurality of blendshapes of the dynamic expression model can be directly applied on the avatar blendshapes in order to derive new facial expressions of the virtual avatar.

According to yet another aspect, a real-time facial animation system is provided including a camera device configured to track facial expressions of a user and generate tracking data; and a processing device according to one embodiment of the present disclosure. Preferably, the processing device may include an input interface coupled to the camera device and configured to receive the tracking data, a memory configured to store a dynamic expression model, and a processing component coupled to the input interface and the memory, the processing component being configured to estimate tracking parameters based on the dynamic expression model and the tracking data, generate a graphical representation corresponding to the facial expression of the user based on the tracking parameters, and refine the dynamic expression model based on the tracking data and the estimated tracking parameters.

According to another embodiment, the camera device is configured to generate video data and depth information. For example, the camera device may be a consumer-level RGB-D camera, such as the Microsoft Kinect camera or Asus Xtion Live camera. The integration of depth and intensity information in a constrained local model improves tracking performance significantly compared to image-based tracking alone. For example, combining 2D and 3D non-registration methods in a single optimization may result in a high-quality tracking. Yet, it is to be understood that the present disclosure is not restricted to a particular camera device and/or tracking system. Rather any camera device and/or tracking system suitable for providing tracking or input data representing facial expressions of a user can be used.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
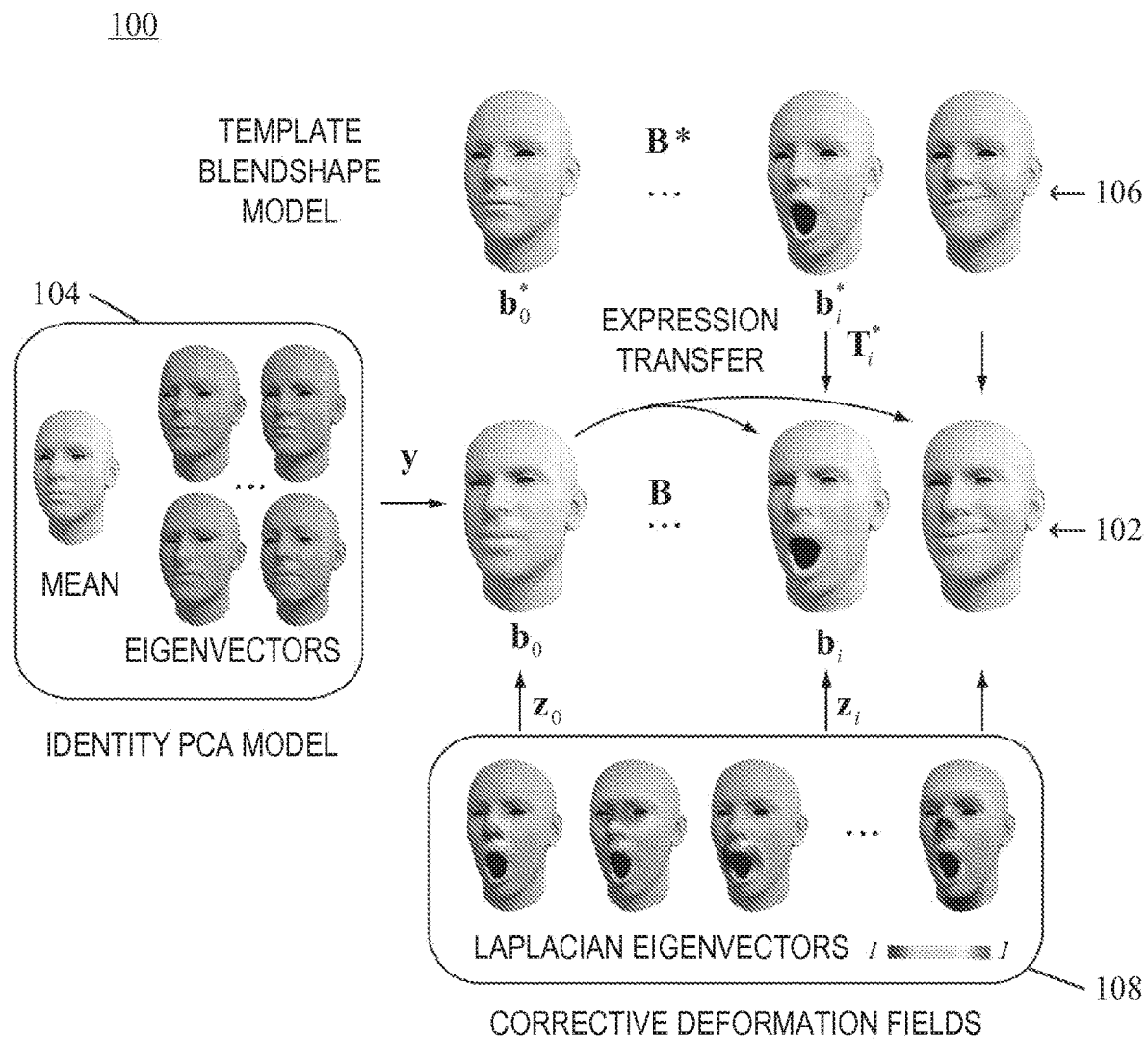
FIG. 1 shows a schematic representation of a dynamic expression model applicable in accordance with one embodiment.

FIG. 1 shows a schematic view of an example of a dynamic expression model used in one embodiment of the present disclosure. The dynamic expression model 100 may include a plurality of blendshapes 102, also denoted as $B=[b_0, \ldots, b_n]$, where $b_0$ may be a blendshape representing a neutral pose or facial expression and blendshapes $b_i$ with i>0 may represent a set of specific basic facial expressions. The blendshapes 102 may have the same static mesh combinatorics and may be represented by stacked coordinate vectors of the corresponding three-dimensional (3D) meshes. In order to generate a graphical representation of a facial expression, the blendshapes 102 may be combined as $B(x)=b_0+\Delta Bx$, where $\Delta B=[b_1-b_0, \ldots, b_n-b_0]$, and $x=[x_1, \ldots, x_n]^T$ are blendshape weights bounded between 0 and 1.

The blendshape $b_0$ representing the neutral facial expression may be approximated to the face geometry of a current user by applying an identity model 104 of the dynamic expression model 100. The identity model 104 may include a mean face m, which may be derived from a large set of meshes of different human faces with one-to-one vertex correspondences in neutral expressions. Furthermore, the identity model 104 may include a plurality of eigenvectors. In an embodiment, the identity model 104 can be an identity PCA model 104, which may be generated using principle component analysis (PCA) on stacked vertex coordinate vectors of respective meshes of the large set of meshes of different human faces. For example, the identity PCA model 104 may include the first I PCA eigenvectors $P=[p_1, \ldots, p_I]$ and the blendshape $b_0$ for the neutral facial expression may be approximated as $b_0=m+Py$ with suitable linear coefficients $y=[y_1, \ldots, y_I]^T$.

The dynamic expression model 100 may further include a template blendshape model 106 including blendshapes $B^*=[b^*_0, b^*_0]$ that preferably correspond to a set of predefined semantics of common face animation controllers, such as mouth-open, smile, frown, etc. and which may be, for example, modeled by hand. The template blendshape model 106 may be utilized to obtain the blendshapes $b_i$ of the dynamic expression model 100. This may be achieved by transferring a known deformation of a neutral expression represented by template blendshape $b^*_0$ of the template blendshape model 106 to a template blendshape $b^*_i$ of the template blendshape model 106 representing a specific facial expression onto the neutral expression $b_0$. This may be done using an operator $T^*_i$, which may be linearly combined with $b_0$. The transfer of the known deformation may be determined according to any technique suitable for representing vertex correspondences between two meshes. Preferably, $T^*_i$ only depends on the vertices of the meshes $b^*_0$ and $b^*_i$, and may be independent of $b_0$.

According to one example, $T^*_i$ can be defined by computing a set of affine transformations $\{S^*_1, \ldots, S^*_p\}$ deforming the p triangles of $b^*_0$ to the corresponding ones of $b^*_i$. As the deformation of a triangle cannot be fully characterized by an affine transformation, tetrahedrons can be used to compute the affine transformations where the forth vertex is added in the direction perpendicular to the triangle. Accordingly, the affine transformation $S^*$ from a tetrahedron $\{v^*_{01}, v^*_{02}, v^*_{03}, v^*_{04}\}$ of $b^*_0$ to the corresponding tetrahedron $\{v^*_{i1}, v^*_{i2}, v^*_{i3}, v^*_{i4}\}$ of $b^*_i$ may be computed as $S^*=S^*_i S^{*(-1)}_0$, where $S^*_i=[v^*_{i2}-v^*_{i1}, v^*_{i3}-$ $v^*_{i1}$, $v^*_{i4}-v^*_{i1}]$ and $S^*_0=[v^*_{02}-v^*_{01}, v^*_{03}-v^*_{01}, v^*_{04}-v^*_{01}]$. The deformation transfer problem can then be formulated as:

$$\underset{b_i}{\operatorname{argmin}} \sum\nolimits_{j=1}^{p} \|s_j^* t_{0j} - t_{ij}\|_2^2 + \mu \|F(b_i - b_0)\|_2^2$$

where $t_{ij}=[v_{i2}-v_{j1}, v_{i3}-v_{j1}]_j$ represents two edges of the triangle j of $b_i$, F is a diagonal matrix defining the vertices that need to be fixed between $b_0$ and $b_i$, and $\mu$ is a weight factor, which can, for example, be fixed to $\mu=100$ for at least some or all computations. This optimization can be reformulated as:

$$\underset{b_i}{\operatorname{argmin}} \|H_i^* G b_0 - G b_i\|_2^2 + \mu \|F(b_i - b_0)\|_2^2,$$

where G is a matrix transforming vertices to edges, and $H^*_i$ is a matrix containing the affine transformations mapping each edge of the template neutral expression $b^*_0$ to the template expression $b^*_i$. The optimal solution of this problem is $b_i=T^*_i b_0$, where $T^*_i=(G^T G+F)^{-1}(G^T H^*_i G+F)$ is a linear operator defining the transformation from the neutral expression $b^*_0$ to an expression b, that matches the transformation of $b^*_0$ to $b^*_i$.

Since $T^*_i$ does not depend on $b_0$, the refinement of the dynamic expression model 100 can be formulated as a solution of a linear system which can be computed efficiently and robustly. In particular, 'I$^*_i$ is based on a graph Laplacian instead of a cotan Laplacian which avoids the weighting factor of triangle areas of $b_0$ in $T^*_i$. This simplification has little effect on the resulting deformations if the face meshes are uniformly tessellated as shown in FIG. 2.

Figure 2:
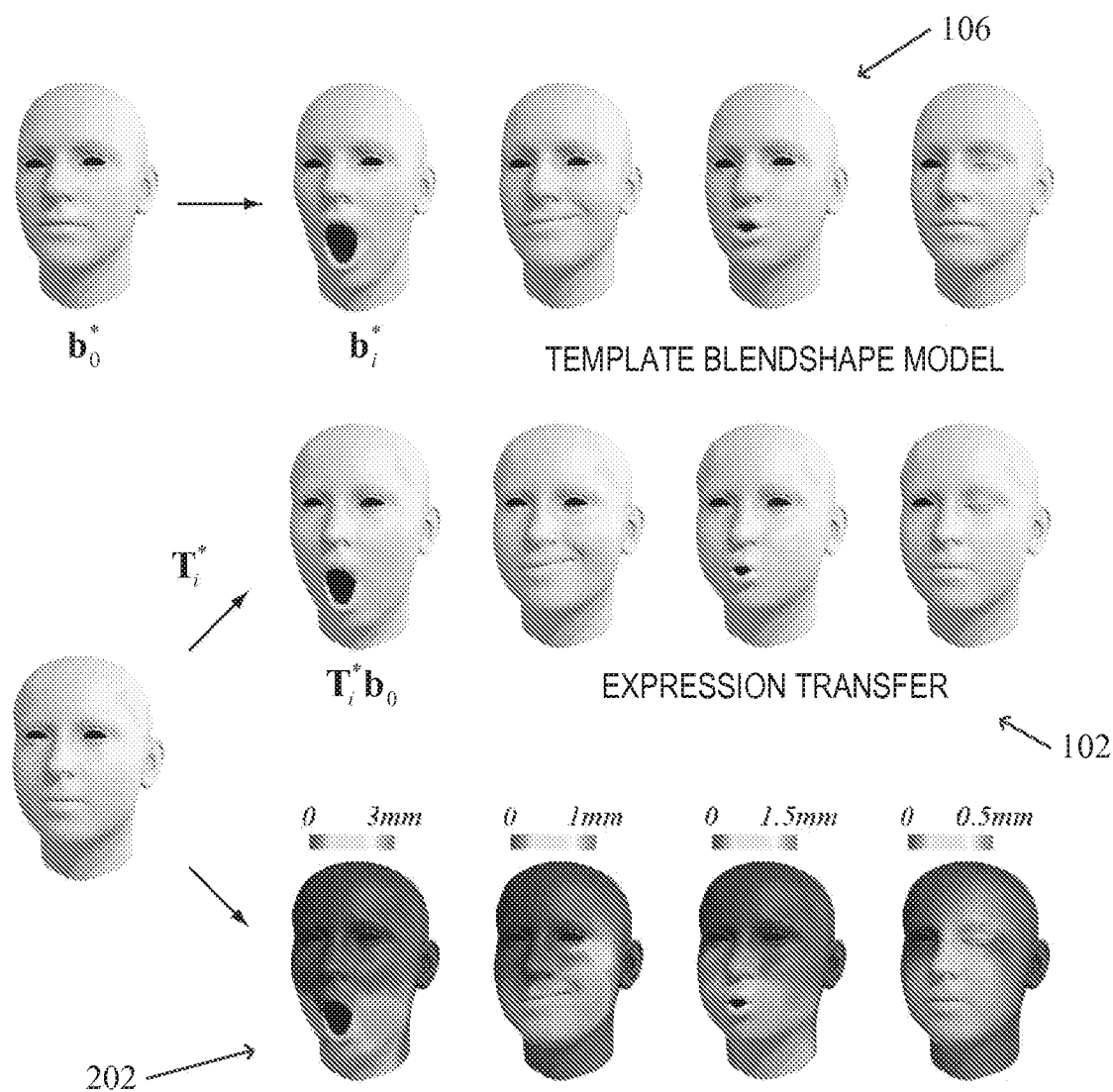
FIG. 2 illustrates a comparison of expression transfer from a template blendshape model according to one embodiment.

FIG. 2 shows results of expression transfer from a template blendshape model 106 to the blendshape model 102 representing a specific user, according to an example embodiment. The results are compared with results of an approach which uses deformation transfer applying cotan Laplacian including a weighting factor of triangle areas of $b_0$ in the transfer operator, which is therefore non-linear with respect to $b_0$. The comparison 202 shows a deviation in millimeters for the respective blendshapes. As shown in FIG. 2, the simplified operator $T^*_i$ has little effect on the resulting deformation and is less than 3.0 millimeters Yet, since the transfer operator $T^*_i$ can be expressed as a linear transformation, the refinement of the dynamic expression model can be formulated as a simple linear system which makes the computation fast and robust.

It is to be understood that even though examples of the transfer operator $T^*_i$ are based on graph Laplacian or cotan Laplacian, the present disclosure is not limited to a particular transfer operator, or a respective derivation.

Returning back to FIG. 1, the dynamic expression model 100 may further include corrective deformation fields 108, which can be used to better capture user-specific details. Per-vertex displacements can be modeled using a spectral representation defined by a plurality of eigenvectors of the graph Laplacian matrix L computed on the 3D face mesh, such as the k last eigenvectors $E=[E_1, \ldots, e_k]$. A smooth deformation field can be defined as a linear combination Ez where $z=[z_1, \ldots, z_k]^T$ are the spectral coefficients. The spectral basis offers two main advantages: the corrective deformations can be optimized in a low-dimensional space, requiring only k variables to represent a deformation of a blendshape mesh, and the in-build smoothness of the low-frequency eigenvectors helps to avoid over-fitting when aligning the blendshapes to noisy depth maps.

The parameterized dynamic expression model 100 can be adapted to a particular tracked user by defining the neutral expression $b_0$ as $b_0=m+Py+Ez_0$, which corresponds to a combination of the identity PCA model 104 and a corrective deformation field 108. The remaining blendshapes $b_1, \ldots, b_n$ can be parameterized as $b_i=T^*_i b_0+Ez_i$, which combines the expression transfer of the template blendshape model 106 to the neutral expression $b_0$ with expression-specific corrective deformation fields 108.

Figure 3:
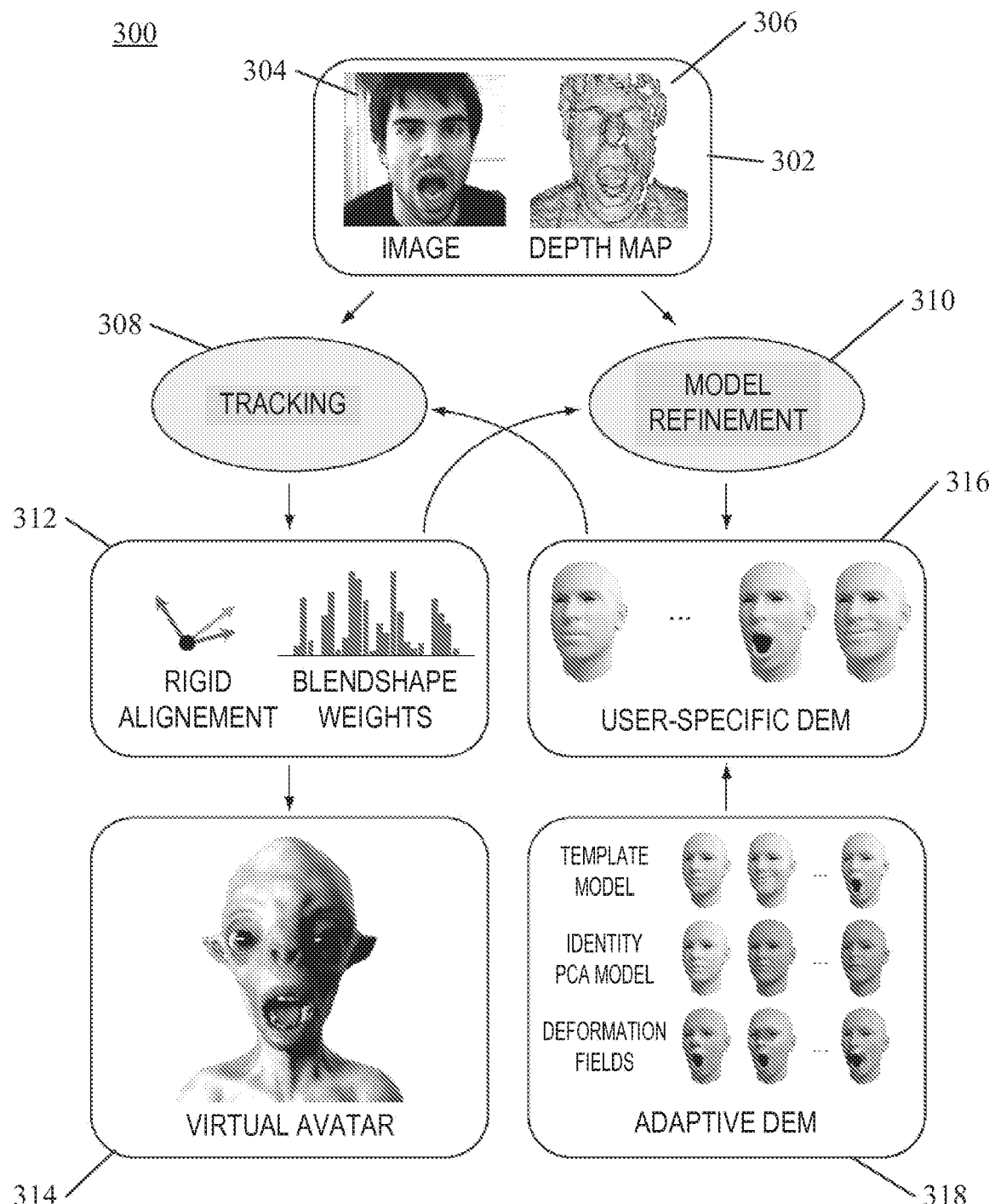
FIG. 3 shows a flowchart of an optimization pipeline in accordance with one embodiment.

FIG. 3 shows a flowchart of an optimization pipeline according to embodiments of the present disclosure. The optimization pipeline may receive input data 302 that may include color image 304 and depth map 306. The input data 302 may be organized in frames. Each frame of input data 302 may be processed using an interleaved optimization that sequentially refines tracking 308 and a model 310. The output of the tracking refinement 308 may comprise tracking parameters 312 including rigid alignment and blendshape weights per frame, which can be used to derive a virtual avatar 314 in real-time. Furthermore, a user-specific dynamic expression model 316 may be adapted during model refinement 310 based on facial characteristics of the observed user according to the input data 302 using an adaptive dynamic expression model 318. It is to be noted that the adaptive dynamic expression model 318 and the user-specific dynamic expression model 316 may correspond to the dynamic expression model 100 as shown in FIG. 1.

The term "real-time" used throughout this disclosure refers to a performance of a computing system or processing device subject to timing constraints, which specify operational deadlines from input or a processing event to an output or a corresponding response. Accordingly, computing or processing systems operating in real-time must guarantee a response according to strict timing conditions, for example, within a range of milliseconds. Preferably, in media systems a real-time response should be delivered without a perceivable delay for the user. For example, a graphical output should be kept at constant frame rates of at least 15 Hz with a latency to the user input of at least 150 milliseconds. Preferably, the frame rates are within a range of 20 Hz to 150 Hz, such as within two of 20, 25, 30, 40, 50, 60, 70, 80, 90, 100, 110, 120, 130, 140 and 150 Hz and, most preferably, at 25 Hz. The latency may be preferably at least 160 milliseconds, preferably within a range of 10 milliseconds to 160 milliseconds, such as within two of 150, 140, 130, 120, 1 10, 100, 90, 80, 70, 60, 50, 40, 30, 20, and 10 milliseconds, and most preferably of 150 milliseconds. The real-time performance of embodiments of the present disclosure can be achieved by separation of the tracking refinement 308 and model refinement 310. The interactive generation of the virtual avatar 314 can be accomplished using blendshapes and the computed blendshape weights. Concurrently, the user-specific dynamic expression model may be selectively refined in order to meet the timing constraints. The tracking refinement 308 includes a determination of a rigid alignment of the face model to the input data 302, such as the input depth map 306 or the image 304. The rigid alignment may be defined by a rotation matrix R and a translation vector t at each frame t of the input data 302. Furthermore, blendshape weights $x=[x_1, \ldots, x_n]^T$ may be determined for each frame t and used to generate the graphical facial expression by applying the blendshape weights to avatar blendshapes representing the virtual avatar 314. It is to be understood that the avatar blendshapes may be different from the blendshapes representing the user in the user-specific dynamic expression model 316. However, the avatar blendshapes may also correspond to the blendshapes representing the user in the user-specific dynamic expression model 316 thereby enabling a virtual representation of the user.

For example, an online avatar of the user can be directly created based on the refined blendshapes, since the user-specific dynamic expression model 316 that was built automatically during model refinement 310 constitutes a fully rigged geometric avatar of the user. The online avatar may further include a reconstruction of texture and other facial features such as hair in order to allow for a complete digital online avatar that can directly be integrated into online applications or communication applications and tools.

During model refinement 310, the identity PCA parameters $y=[y_1, \ldots, y_l]^T$ for the neutral face expression $b_0$ of the user and the deformation coefficients $Z=\{z_1, \ldots, z_n\}$, with $z_i = [z_{i,1}, \ldots, z_{i,k}]^T$ for each blendshape $b_i$ are determined.

Throughout the description, superscripts may be used to refer to a specific time frame of the input data 302, such as $x^t$ may denote the blendshape weights at frame $t(n)$ and $t=1$ may denote the first frame. Yet, it is to be understood that superscripts may also be omitted when irrelevant or clear from the context in order to simplify the notation.

The general optimization including the tracking refinement 308 and model refinement 310 may alternate between two stages. In the first stage related to tracking refinement 308, also referred to herein as tracking stage, the rigid alignment and blendshape weights x may be estimated, keeping the dynamic expression model 316, 318 fixed. In the stage related to model refinement 310, also referred to herein as model refinement stage, the user-specific dynamic expression model 316 may be refined by solving for the PCA parameters y and the deformation coefficients Z keeping the blendshape weights x fixed. The alternating processing may be bootstrapped by initializing the dynamic expression model 316, 318 with a PCA reconstruction for the neutral expression and a deformation transfer from the template model of the adaptive dynamic expression model 318 to the user-specific dynamic expression model 316.

According to an exemplifying embodiment, the user is only required to initially enter a sensor's field of view in a neutral facial expression, thus providing input data 302 for the neutral facial expression. The input data 302 may be pre-processed to detect the face of the user and crop the depth map in order to obtain a 3D scan of the face geometry of the user in neutral expression. From this initial face scan, a first approximation of $b_0$ may be computed by aligning the parameterized neutral expression to the depth map. This can be done using any technique suitable for aligning a parameterized mesh to a depth map, such as by solving an optimization problem.

For example, the alignment may be achieved by minimizing the common iterative closest point (ICP) energy with point-plane constraints and solving for the PCA coefficients y, the deformation coefficient $z_0$, and the rigid head pose (R, t). The optimization problem can be defined as:

$$\operatorname*{argmin}_{R,t,y,z_0} \|A_0 R b_0 + t) - c_0\|_2^2 + \beta_1 \|D_P y\|_2^2 + \beta_2 \|D_E z_0\|_2^2 + \beta_3 \|z_0\|_2^2.$$

In this formulation, $(A_0, c_0)$ summarizes the ICP constraint equations in the first term of the objective function. The remaining summands are regularization terms with corresponding positive scalar weights $\beta_1$, $\beta_2$, and $\beta_3$. The term $D_P y$ regularizes the PCA weights, where $D_P$ is a diagonal matrix containing the inverse of the standard deviation of the PCA basis. The term $D_E z_0$ regularizes the deformation coefficients by measuring the bending of the deformation. $D_E$ is the diagonal matrix of eigenvalues corresponding to the eigenvectors in E of the Laplacian matrix L. The last summand penalizes the magnitude of the deformation vectors.

The optimization may be solved using the Gauss-Newton method, yet it is to be understood that any other solving technique could be used. For example, the solver may be initialized with $y=z_0=0$, and the input data 302 corresponding to the initial face expression may be retrieved from the sensor device with the user assumed to be front-facing. Given the reconstruction of $b_0^1$, at the first frame (t=1), the additional blendshapes may be initialized by applying the deformation transfer operator, i.e. $b_i^1 = T^*_i b_0^1$ for $i=1, \ldots, n$.

After the initial estimation of the blendshapes $b_i$, the tracking stage 308 may start solving for the blendshape weights x and the rigid motion or alignment (R, t) for each time frame t assuming that the dynamic expression model 316, 318 is fixed.

The rigid motion or alignment may be estimated by directly aligning the static reconstructed mesh of the previous frame t-1 with the acquired depth map of the current frame t using ICP with point-plane constraints. In order to further stabilize the rigid motion, the constraints may only be defined for specific regions of the face geometry, such as the front head and nose region of the reconstructed mesh.

Given the rigid motion and the current set of blendshapes B of the user-specific dynamic expression model 316, the estimation of the blendshape weights x that best match the input data 302 of the current frame may be formulated as a combined 2D/3D registration. The two-dimensional (2D) registration may be formulated using optical flow constraints, and the 3D registration may use ICP as discussed above. This may yield a fitting energy of the form $E_{fit} = \|A(b_0 + \Delta B x) - c\|_2^2$, where (A, c) summarize the registration constraints on a pre-defined subset of the face vertices, such as the front-part of the face mesh. The optimization may iteratively minimize the following energy according to Equation (1):

$$\arg_x \min E_{fit} + \lambda_1 E_{smooth} + \lambda_2 E_{sparse}. \quad (1)$$

Accordingly, two additional terms, $E_{smooth}$ and $E_{sparse}$ with non-negative weights $\lambda_1$ and $\lambda_2$, may be added for regularization. Temporal smoothness may be enforced by penalizing the second-order difference $E_{smooth} = \|x^{t-2} - 2x^{t-1} + x^t\|_2^2$, where t denotes the current timeframe.

Furthermore, the 1-norm regularization $E_{sparse} = \|x\|_1$ on the blendshape coefficients may be applied. The sparsity-inducing energy $E_{sparse}$ may stabilize the tracking, since the blendshape basis is not linearly independent. Therefore, the same facial expression could, in principle, be represented by different blendshape combinations. $E_{sparse}$ favors a reconstruction with as few blendshapes as possible in order to avoid potential blendshape compensation artefacts and better match the blendshape weights a human animator would typically choose, which is advantageous for retargeting to other virtual avatars, such as the avatar blendshapes of the virtual avatar 314.

The optimization may be performed using any optimization technique, such as an interior point method, interactive re-weighting, shooting method and other approaches known to a skilled person. For example, a warm started shooting method could be used as, for example, described in W. J. Fu: "Penalized regressions: the bridge versus the lasso", Journal of Computational and Graphical Statistics, 7, 3, pages 397-416, 1998, wherein the blendshape weights x may be bounded between 0 and 1 by projection over the constraint set at each iteration.

The model refinement stage 310 of the optimization may adapt the blendshape model of the user-specific dynamic expression model 316 to the user by solving for the PCA parameters y and deformation coefficient $z_0, \ldots, z_n$ of the adaptive dynamic expression model 318, keeping the rigid pose (R, t) and the blendshape weights x computed in the tracking stage 308 fixed. The refined PCA parameters y and deformation coefficient $z_0, \ldots, z_n$ which result in blendshapes B of the user-specific dynamic expression model 316 that better approximate the face geometry of the user can be estimated using any optimization technique or approach.

For example, the fitting energy $E_{fit}$ discussed above can be rewritten as:

$$E_{fit} = \|A(b_0 + \Delta Bx) - c\|_2^2 = \|A[\bar{x}b_0 + \Sigma_{i=1}^n x_i b_i] - c\|_2^2,$$

where $\bar{x} = 1 - \Sigma_{i=1}^n x_i$. With $b_0 = m + Py + Ez_0$ and $b_i = T^*_i b_0 + Ez_i$, this term can be reformulated as $E_{fit} = \|\bar{A}u - \bar{c}\|_2^2$, where $$\bar{A} = A[(\bar{x}I + \Sigma_{i=1}^n x_i T^*_i) P, (\bar{x}I + \Sigma_{i=1}^n x_i T^*_i) E, x_1 E, \ldots, x_n E],$$

$u = [y^T, z_0^T, \ldots z_n^T]^T$, and $\bar{c} = c - A(\bar{x}I + \Sigma_{i=1}^n x_i T^*_i)m.$ As discussed above, the PCA coefficients y and deformation coefficients $z_i$ may be regularized, leading to a model refinement energy defined as Equation (2):

$$E_{ref} \|\bar{A}u - \bar{c}\|_2^2 + \beta_1 \|D_p y\|_2^2 + \Sigma_{i=0}^n (\beta_2 \mu D_E z_i\|_2^2 + \beta_3 \|z_i\|_2^2) \quad (2)$$

The refinement of the dynamic expression model according to one or more embodiments of the present disclosure significantly improves tracking accuracy. The expression transfer operator according to one embodiment ensures that the user's specific dynamic expression model retains the blendshape semantics of the template model. The blendshape weights computed during tracking can therefore be directly used to drive a compatible face rig with the same blendshape configuration, such as avatar blendshapes representing facial expressions of a virtual avatar. The retargeting incurs no extra costs and can be therefore used for real-time applications. Even virtual avatars with significantly different facial features than the tracked user can be animated faithfully with the approach described above with regard to one or more embodiments of the present disclosure.

Figure 4:
FIG. 4 shows a graphical representation of a virtual avatar generated using embodiments of the disclosed subject matter.

FIG. 4 shows four example images including the acquired image data for one frame and the resulting facial expression of the virtual avatar generated according to one embodiment of the present disclosure. The resulting facial expression of the virtual avatar may correspond to the virtual avatar 314 as shown in FIG. 3. Furthermore, the acquired image data may correspond to the image data 304 of the input data 302 as shown in FIG. 3.

Further to the graphical representation of the face geometry of the virtual avatar, FIG. 4 also illustrates the results of eye tracking. In a exemplifying embodiment, a separate image-based eye tracker may be used to determine the location of the eyes of the user. The rigid and the non-rigid alignment as discussed with reference to FIG. 3 may be used to accurately determine the location of the eyes in a color image of the tracking data, such as in the image 304 of the input data 302. A k-nearest neighbor search may be applied in a data base of labelled eyes by cropping, rectifying and normalizing the input image. The k-nearest neighbor search may be implemented using well-known techniques, which may be, for example, implemented in a library, such as the OpenCV library. Yet, it is to be understood that any other implementation of the k-nearest neighbor algorithm can be used. The data base may store eye images which may be, for example, rectified, cropped, and/or color normalized.

The result may be a weighted average of the labels of the k neighbors. The result of the eye tracker may drive one or more supplementary blendshapes localized around the eyes, for example 14 supplementary blendshapes. The supplementary blendshapes may be computed using expression transfer only and may be computed separately from the model refinement optimization. The pupil and eyelid location may be used as a geometric constraints during tracking.

In yet another exemplary embodiment, speech analysis may be integrated in order to improve lip synchronization.

Figure 5:
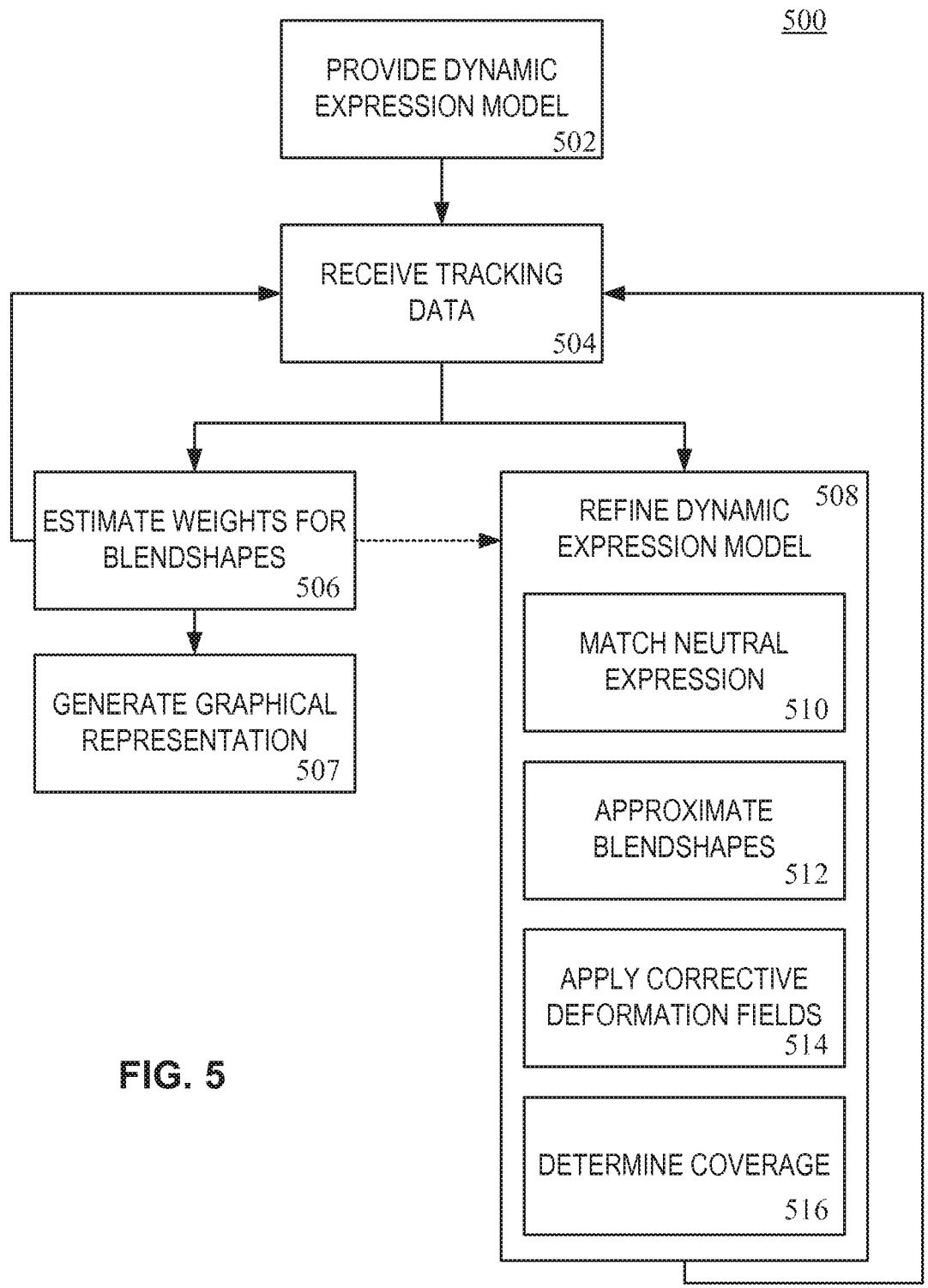
FIG. 5 is a flowchart of a method according to one embodiment.

FIG. 5 is a flowchart of a method according to one embodiment of the present disclosure. The method 500, which may be a computer-implemented method, may start in step 502 by providing a dynamic expression model including a plurality of blendshapes. In step 504, tracking data or input data corresponding to facial expressions of a user may be received, such as the input data 302 discussed with reference to FIG. 3.

In step 506, weights for the blendshapes of the dynamic expression model may be estimated based on the tracking data. A graphical representation corresponding to the facial expression of the user may be generated according to the weights, in step 507. In the example illustrated in FIG. 5, the steps 506 and 508 may correspond to the tracking stage 308 of FIG. 3. Subsequently or concurrently, the dynamic expression model may be refined to the face geometry of the user based on the tracking data and the estimated weights for the blendshapes in step 508, which may correspond to the refinement stage 310 of FIG. 3.

The dynamic expression model may include one or more of an identity PCA model, a template blendshape model and corrective deformation fields. The plurality of blendshapes may at least include a blendshape $b_0$ representing a neutral facial expression and one or more further blendshapes $b_i$ representing different facial expressions. In step 510, the blendshape $b_0$ representing the neutral facial expression may be matched to the neutral expression of the user based on the identity PCA model. Furthermore, the one or more blendshapes $b_i$ may be further approximated based on the template blendshape model and the blendshape $b_0$ representing the neutral facial expression, in step 512. Subsequently, at least one of the corrective deformation fields may be applied to each of the plurality of blendshapes, in step 514. It is to be understood that one or more of the steps 510 to 514 could be omitted according to the dynamic expression model provided in step 502. Furthermore, steps 510 to 514 may be at least partially performed in parallel and may include steps of solving an optimization problem as, for example, discussed with regard to FIG. 3.

Refining of the dynamic expression model according to step 508 may be based on input or tracking data received for a current frame and one or more past frames, wherein the input or tracking data of the one or more past frames may also be aggregated subject to decay over time. Since optimizing all frames of the frame history could quickly become prohibitive in terms of memory and computation overhead, an aggregation scheme can be used which keeps the memory cost constant. The optimization may be formulated as:

$$\underset{y, z_0, \ldots z_n}{\text{argmin}} \sum_{j=1}^{t} \frac{\gamma^{t-j}}{\sum_{j=1}^{t} \gamma^{t-j}} E_{ref}^{j},$$

where t is the current frame and $0 \leq \gamma \leq 1$ defines an exponential decay over the frame history. Preferably, $\gamma=0.9$ can be used which provides a good balance of the trade-off between fitting error and temporal variance. Yet, it is to be understood that other values for the decay parameter $\gamma$ can be used as well. $E_{ref}^{j}$ denotes the model refinement energy at time j as discussed above. A solution of the minimization problem can be found using any suitable optimization technique such as gradient descent, Gauss-Newton, Levenberg-Marquardt or other techniques well known to a skilled person. For example, the optimal solution of the minimization can be found by solving:

$$\left(D + \sum_{j=1}^{t} \frac{\gamma^{(t-j)}}{\sum_{j=1}^{t} \gamma^{t-j}} (\overline{A}^{j})^{T} \overline{A}^{j}\right) u = \sum_{j=1}^{t} \frac{\gamma^{(t-j)}}{\sum_{j=1}^{t} \gamma^{t-j}} (\overline{A}^{j})^{T} \overline{c}^{j},$$

where D is a diagonal matrix containing the regularization terms of the model refinement energy as defined in Equation (2) above.

This system can be solved using any optimization technique known in the art. For example, a warm-started Gauss-Seidel optimization can be utilized as, for example, described in T. Barrett et al.: "Templates for the Solution of Linear Systems: Building Blocks for Iterative Methods", SIAM, 1994. Preferably, the optimization can be solved using the following algorithm:

---
Algorithm 1: Blendshape Refinement at frame t

1. Initialization: $M^1 = 0$, $y^1 = 0$, $s^1 = 0$
2. $s^t = \gamma s^{t-1} + 1$
3. 
$$M^t = \gamma \frac{s^{t-1}}{s^t} M^{t-1} + \frac{1}{s^t}(\overline{A}^t)^T \overline{A}^t$$
4. 
$$y^t = \gamma \frac{s^{t-1}}{s^t} y^{t-1} + \frac{1}{s^t}(\overline{A}^t)^T \overline{c}^t$$
5. Output: $u^t = \text{GaussSeidel}(M^t + D, y^t, u^{t-1})$
---

The algorithm allows for optimizing over the entire history of frames with a fixed memory overhead, since the frames need not to be stored separately.

The refinement of the dynamic expression model in step 508 may further include step 516, wherein a coverage coefficient $\sigma_i$ may be determined for each blendshape $b_i$ d the dynamic expression model. The coverage coefficient may be indicative of an applicability of the past tracking data for the blendshape $b_i$. Accordingly, the refinement 508 can be optimized in that only blendshapes having a coverage coefficient below or above a predetermined threshold are refined. Hence, the number of blendshapes optimized during the refinement step 508 may gradually decrease as more blendshapes reach the coverage threshold, which may significantly reduce the total computation time per frame. For example, the coverage coefficient $a_i$ may be defined as $\sigma_i = \sum_{j=1}^{t} x_i^j$ that measures how well each blendshape $b_i$ has been observed until the current frame t. As soon as $\sigma_i > \overline{\sigma}$ for a fixed threshold $\overline{\sigma}$, the corresponding blendshape $b_i$ may be considered as saturated and may remain constant for the subsequent optimization.

Since the neutral expression $b_0$ plays a special role as source for expression transfer, the full optimization for $b_0$ may always be performed until $E_{j=1}^{t} \max(\overline{x}_j, 0) > \overline{\sigma}$. Since $b_0$ is the blendshape that is typically most often observed, this constraint will not affect the performance significantly. The computational costs decrease gradually as more blendshapes reach their coverage threshold. Hence, the refinement of the dynamic expression model in step 508 quickly becomes negligible compared to tracking stage 506, 507 of the optimization.

Figure 6:
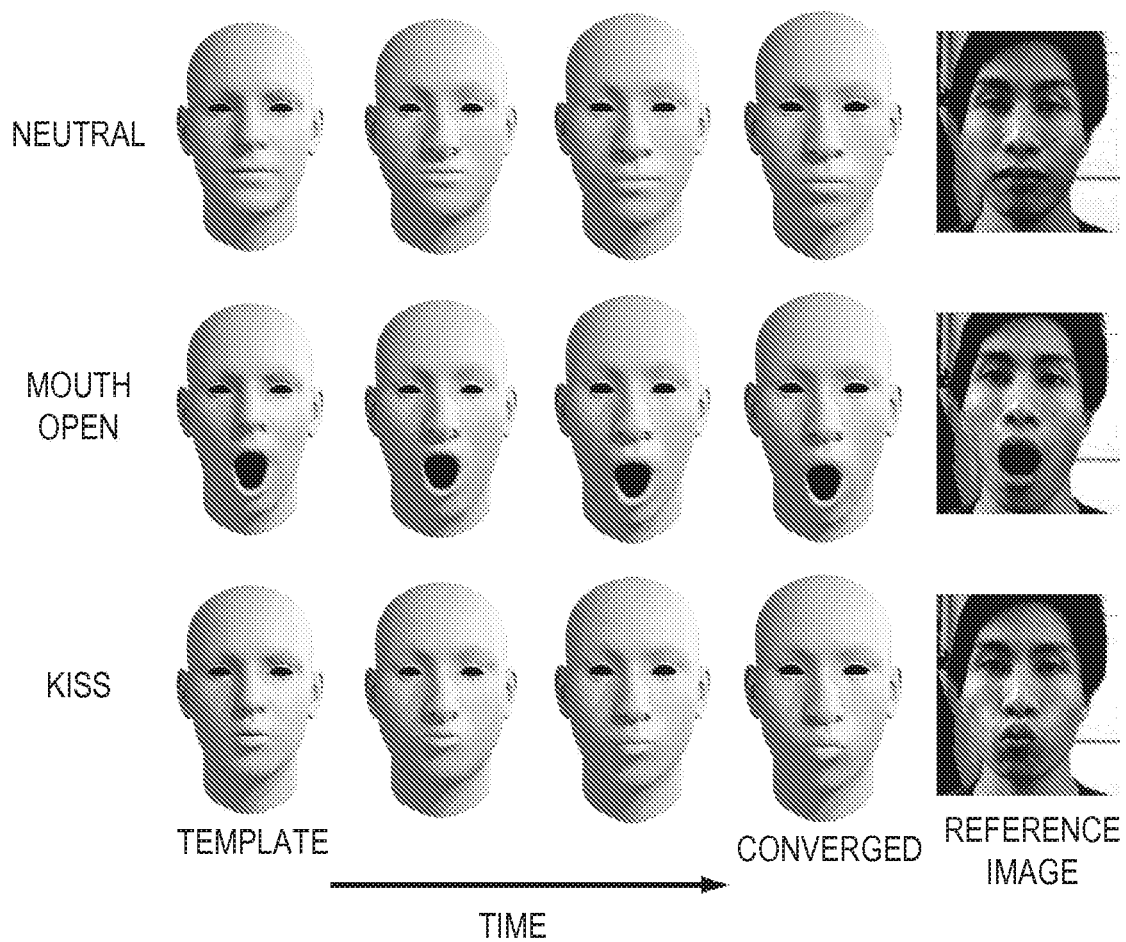
FIG. 6 shows a progressive refinement of blendshapes of the dynamic expression model in accordance with one embodiment.

FIG. 6 shows an example of the progressive refinement of the dynamic expression model according to one embodiment of the present disclosure for three blendshapes representing the expression semantics "neutral", "mouth open", and "kiss". The initial blendshapes in the first column may be based on the initial approximation of the neutral expression of the user according to the identity PCA model and respective expression transfers according to the template blendshape model as, for example, discussed above with reference to FIG. 3. Each respective blendshape may be refined over time based on the frame history for the observed expression until the respective blendshape has been found to be "saturated" based on a coverage coefficient and the number of observations of each respective facial expression. Each row shows the temporal evolution and refinement of a particular blendshape. The input image on the right is provided for reference. The refinement of the dynamic expression model is robust even when large deformations are required to match the face geometry of the tracked user.

Figure 7:
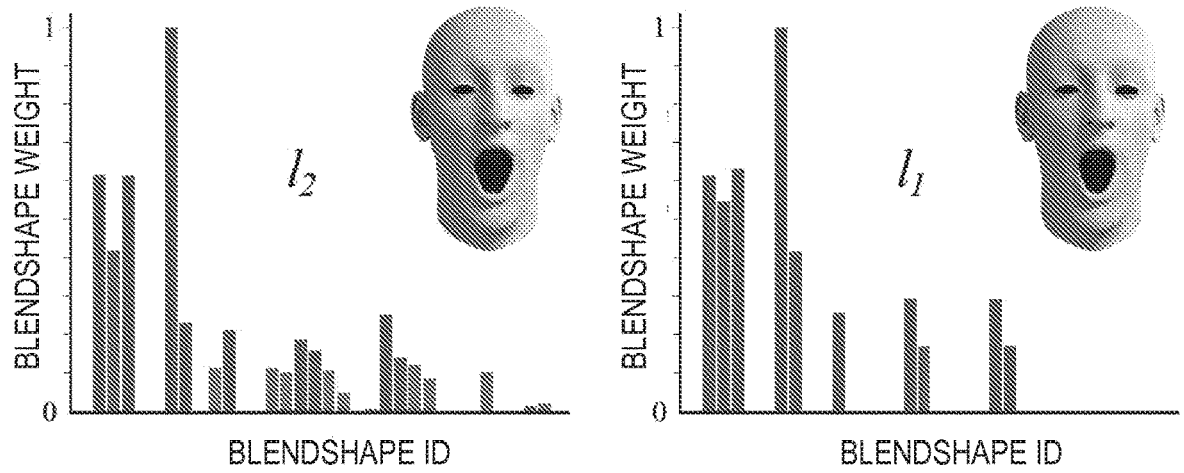
FIG. 7 shows different sets of blendshape weights used to approximate a facial expression of the user according to one embodiment.
Figure 8:
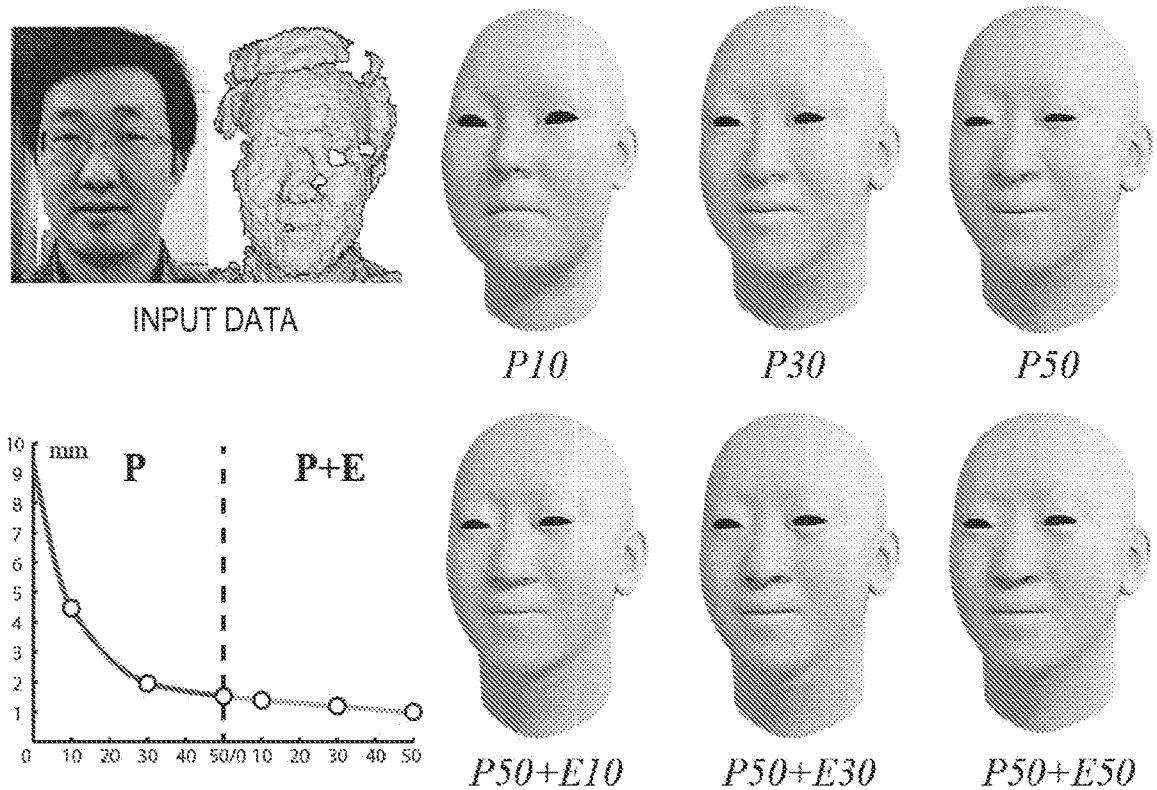
FIG. 8 depicts results of an initial estimation of a neutral facial expression using different dynamic expression models in accordance with one embodiment.

FIG. 7 shows a comparison of different blendshape weights used to generate a resulting facial expression, including a comparison between $l_1$ and $l_2$ regularization for the blendshape weight optimization according to Equation (1) discussed above. The $l_1$ regularization leads to a lower average fitting error of 2.27 millimeter (mm) compared to 2.72 mm for the $l_2$ regularization. The $l_1$ regularization also significantly reduces the number of non-zero blendshape weights. Accordingly, the $l_1$ regularization leads to a significant speed-up of the subsequent model refinement stage, since blendshape refinement is only performed on blendshapes with non-zero blendshape weights. FIG. 8 shows how the optimization of the neutral facial expression depends on the number of basis vectors used for the identity PCA model and the corrective deformation fields, respectively. In particular, FIG. 8 shows an exemplary evaluation of the initial estimation of the neutral facial expression $b_0$, when varying the number of PCA eigenvectors in the identity PCA model of the dynamic expression models, such as the identity PCA model 104 discussed with reference to FIG. 1. Furthermore, the number of Laplacian eigenvectors of the corrective deformation fields is varied, such as the number of Laplacian eigenvectors k of the corrective deformation fields 108 discussed with reference to FIG. 1. The input data including a color image and a depth map, such as the color image 304 and the depth map 306 as shown in FIG. 3, are shown for illustrative purposes. Furthermore, the resulting reconstructed facial expressions using ten (P10) to 50 PCA eigenvectors (P50) and combinations of 50 PCA eigenvectors with ten (P50+E10) to 50 last eigenvectors of the graph Laplacian matrix (P50+E50) are shown. The results show that the more eigenvectors are used, the better the approximation of the neutral facial expression $b_0$. Furthermore, FIG. 8 shows a graph including the mean non-rigid ICP error averaged over a sequence of 440 frames, which may correspond to the fitting energy $E_{fit}$ discussed above with regard to FIG. 3. According to one example, there may be no significant improvement beyond 50 basis vectors for the PCA model. For the deformation fields, 50 Laplacian eigenvectors may be sufficient to obtain accurate reconstructions while still enabling real-time performance.

Figure 9:
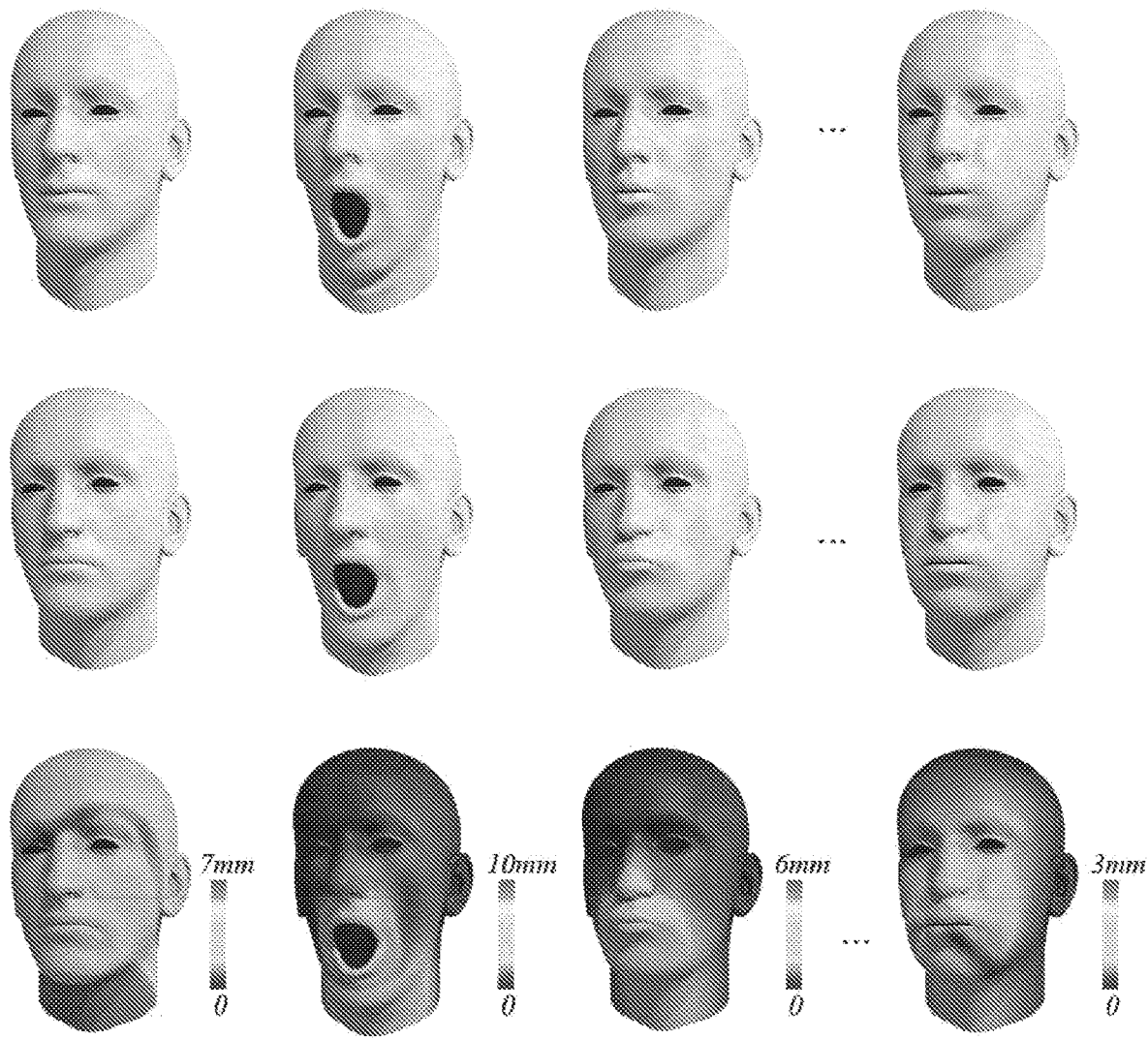
FIG. 9 illustrates an application of corrective deformation fields in a dynamic expression model according to one embodiment.

FIG. 9 shows examples of the effect of the application of corrective deformation fields used during refinement of the dynamic expression model according to one embodiment, as discussed above with regard to the corrective deformation fields 108 of FIG. 1 as well as the adaptive dynamic expression model 318 and the user-specific dynamic expression model 316 of FIG. 3.

The first row shows the use of a dynamic expression model having only an identity PCA model. Accordingly, the left-most neutral facial expression may be defined as $b_0 = m + Py$ and the further facial expressions as $b_i = T^*_i b_0$, respectively. In the second row of FIG. 9, another dynamic expression model has been used and corrective deformation fields have been applied to the blendshapes. Accordingly, the left-most blendshape for the neutral expression may be defined as $m + Py + Ez_0$ and the further blendshapes as $T^*_i b_0 + Ez_0$. The last row shows the corresponding vertex displacements caused by the deformation fields $Ez_i$. Notable changes can be, for example, observed in the mouth region and around the nostrils. In general, such per-vertex deformations can represent an important factor to capture geometric detail and asymmetries in many faces.

Even though exemplary embodiments of the present disclosure have been described with a particular set of blendshapes, it is to be understood that the present disclosure is not limited to a particular number and set of blendshapes as well as particular facial expressions or semantics for the blendshapes. Rather, the dynamic expression model may include more or less blendshapes to obtain a more accurate facial expression space.

An exemplary implementation of one embodiment of the present disclosure may employ a blendshape model of 34 blendshapes. The identity PCA model may be computed from a data set consisting of 100 male and 100 female head scans of young adults, such as the data provided described by V. Blanz and T. Vetter in "A morphable model for the synthesis of 3D faces", SIGGRAPH 1999. 50 PCA basis vectors could be used to approximate the neutral expression. The corrective deformation fields may be represented by 50 Laplacian eigenvectors for each coordinate. Suitable parameters for the optimizations as discussed above may be set to $\beta_2=0.5$, $\beta_2=0.1$, and $\beta_3=0.001$, as well as $\lambda_1=10$ and $\lambda_2=20$, and $\bar{\sigma}=10$ for the coverage threshold.

The methods according to embodiments of the present disclosure may be implemented as dedicated hardware, software or combinations thereof. For example, software may be implemented in C++ and parallelized using OpenMP. However, it is to be understood that any other programming language and paradigm may be used to implement the methods according to embodiments of the present disclosure, such as using C, Java and others, and that other libraries for parallel processing can be used as well. Hence, the present disclosure is not limited to a particular implementation, programming language or paradigm and a respective library. Furthermore, any suitable library for numerical and graphical computations can be used, such as the Eigen library for linear algebra computations and OpenCV for face detection and image processing operations.

Embodiments of the present disclosure may be implemented on a general-purpose computing device or within a logic or dedicated hardware. For example, one embodiment of the present disclosure can be implemented on a MacBook Pro with an Intel Core i7 2.7 GHz processor, 16 GBytes of main memory, and an NVIDIA GeForce GT 650M 1024 MB graphics card, resulting in sustained frame rates of 25 Hz with a latency of 150 milliseconds. Yet, the present disclosure is not restricted to a particular general-purpose computing device or a particular dedicated hardware.

The approach according to the present disclosure is capable of replacing user-specific training and manual calibration for facial performance capture systems while maintaining high tracking accuracy. It only requires a low-cost 3D sensor and no manual assistance of any kind. Accordingly, the approach is well-suited for new applications and communication, such as in game puppetry, virtual avatars for social networks or computer-assisted real-time training applications.

Aspects of the disclosed subject matter such as receiving tracking data, estimating tracking parameters, refining the dynamic expression model, and storing a dynamic expression model, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the disclosed subject matter may be practiced with a variety of computer-system configurations, including multiprocessor systems, microprocessor-based or programmable-consumer electronics, minicomputers, mainframe computers, and the like. Any number of computer-systems and computer networks are acceptable for use with the disclosed subject matter.

Specific hardware devices, programming languages, components, processes, protocols, and numerous details including operating environments and the like are set forth to provide a thorough understanding of the present disclosure. In other instances, structures, devices, and processes are shown in block-diagram form, rather than in detail, to avoid obscuring the disclosed subject matter. But an ordinary-skilled artisan would understand that the disclosed subject matter may be practiced without these specific details. Computer systems, servers, work stations, and other machines may be connected to one another across a communication medium including, for example, a network or networks.

As one skilled in the art will appreciate, embodiments of the present disclosed subject matter may be embodied as, among other things: a method, system, or computer-program product. Accordingly, the embodiments may take the form of a hardware embodiment, a software embodiment, or an embodiment combining software and hardware. In an embodiment, the disclosed subject matter takes the form of a computer-program product that includes computer-useable instructions embodied on one or more computer-readable media.

Computer-readable media include both volatile and non-volatile media, transitory and non-transitory, transient and non-transient media, removable and non-removable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The disclosed subject matter may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The disclosed subject matter may be practiced in a network environment such as a communications network. Such networks are widely used to connect various types of network elements, such as routers, servers, gateways, and so forth. Further, the disclosed subject matter may be practiced in a multi-network environment having various, connected public and/or private networks.

Communication between network elements may be wireless or wireline (wired). As will be appreciated by those skilled in the art, communication networks may take several different forms and may use several different communication protocols. And the disclosed subject matter is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

While some embodiments have been described in detail, it is to be understood that the aspect of the disclosure can take many forms. In particular, the claimed subject matter may be practiced or implemented differently from the examples described, and the described features and characteristics may be practiced or implemented in any combination. The embodiments shown herein are intended to illustrate rather than to limit the disclosed subject matter as defined by the claims.

The invention claimed is:

1. A method for real-time facial animation, comprising:
providing a dynamic expression model that includes a plurality of blendshapes;
receiving tracking data from a plurality of frames in a temporal sequence, the tracking data corresponding to facial expressions of a user;
estimating one or more weight values of the blendshape for each of the plurality of frames, wherein the weight values are based on a combined 2D/3D registration of the dynamic expression model; and
generating a graphical representation of a particular facial expression of the user based on the estimated weight values of the blendshapes for the plurality of frames.

2. The method of claim 1, further comprising:
rendering an animated visual representation of the user based on the graphical representation.

3. The method of claim 1 further comprising:
receiving further tracking data corresponding to facial expressions of the user;
estimating updated weight values based on the further tracking data; and
refining the dynamic expression model based on the estimated updated weight values.

4. The method of claim 1, further comprising:
receiving neutral tracking data corresponding to a neutral facial expression of the user; and
initializing the dynamic expression model using the neutral tracking data.

5. The method of claim 1, wherein the plurality of blendshapes each correspond to a unique facial expression.

6. The method of claim 1, wherein the dynamic expression model further includes a template blendshape model, and wherein the method further comprises:
approximating one or more of the plurality of blendshapes based on the template blendshape model.

7. The method of claim 1, wherein estimating weight values is repeated based on each of the plurality of frames in the temporal sequence.

8. A non-transitory computer readable medium comprising computer readable code for real-time facial animation, executable by one or more processors to:
provide a dynamic expression model that includes a plurality of blendshapes;
receive tracking data from a plurality of frames in a temporal sequence, the tracking data corresponding to facial expressions of a user;
estimate one or more weight values of the blendshape for each of the plurality of frames, wherein the weight values are based on a combined 2D/3D registration of the dynamic expression model; and
generate a graphical representation of a particular facial expression of the user based on the estimated weight values of the blendshapes for the plurality of frames.

9. The non-transitory computer readable medium of claim 8, further comprising computer readable code to:
render an animated visual representation of the user based on the graphical representation.

10. The non-transitory computer readable medium of claim 8, further comprising computer readable code to:
receive further tracking data corresponding to facial expressions of the user;
estimate updated weight values based on the further tracking data; and
refine the dynamic expression model based on the estimated updated weight values.

11. The non-transitory computer readable medium of claim 8, further comprising computer readable code to:
receive neutral tracking data corresponding to a neutral facial expression of the user; and
initialize the dynamic expression model using the neutral tracking data.

12. The non-transitory computer readable medium of claim 8, wherein the plurality of blendshapes each correspond to a unique facial expression.

13. The non-transitory computer readable medium of claim 8, wherein the dynamic expression model further includes a template blendshape model, and wherein the computer readable code further comprises computer readable code to:
approximate one or more of the plurality of blendshapes based on the template blendshape model.

14. The non-transitory computer readable medium of claim 8, wherein the computer readable code to estimate weight values is repeated based on each of the plurality of frames in the temporal sequence.

15. A system for real-time facial animation, comprising:
one or more processors; and
one or more storage devices coupled to the one or more processors, and comprising computer readable code executable by the one or more processors to:
provide a dynamic expression model that includes a plurality of blendshapes;
receive tracking data from a plurality of frames in a temporal sequence, the tracking data corresponding to facial expressions of a user;
estimate one or more weight values of the blendshape for each of the plurality of frames, wherein the weight values are based on a combined 2D/3D registration of the dynamic expression model; and
generate a graphical representation of a particular facial expression of the user based on the estimated weight values of the blendshapes for the plurality of frames.

16. The system of claim 15, further comprising computer readable code to:
render an animated visual representation of the user based on the graphical representation.

17. The system of claim 15, further comprising computer readable code to:
receive further tracking data corresponding to facial expressions of the user;
estimate updated weight values based on the further tracking data; and
refine the dynamic expression model based on the estimated updated weight values.

18. The system of claim 15, further comprising computer readable code to:
receive neutral tracking data corresponding to a neutral facial expression of the user; and
initialize the dynamic expression model using the neutral tracking data.

19. The system of claim 15, wherein the plurality of blendshapes each correspond to a unique facial expression.

20. The system of claim 15, wherein the dynamic expression model further includes a template blendshape model, and wherein the computer readable code further comprises computer readable code to:
approximate one or more of the plurality of blendshapes based on the template blendshape model.

* * * * *